United States Patent [19]

Krutzner

[11] Patent Number: 4,490,109
[45] Date of Patent: Dec. 25, 1984

[54] APPARATUS FOR HEAT TREATMENT OF FINE-GRAINED MATERIAL

[75] Inventor: Karl Krutzner, Beckum, Fed. Rep. of Germany

[73] Assignee: Krupp Polysius AG, Beckum, Fed. Rep. of Germany

[21] Appl. No.: 496,969

[22] Filed: May 23, 1983

[30] Foreign Application Priority Data

Jun. 11, 1982 [DE] Fed. Rep. of Germany ....... 3222131

[51] Int. Cl.³ .......................... F27B 15/00; F27B 7/02
[52] U.S. Cl. ...................................... 432/106; 432/14
[58] Field of Search .......................... 432/106, 58, 14

[56] References Cited

U.S. PATENT DOCUMENTS

| | | | |
|---|---|---|---|
| 3,836,323 | 9/1974 | Engel | 432/58 |
| 4,201,546 | 5/1980 | Herchenbach et al. | 432/58 |
| 4,260,370 | 4/1981 | Goldmann et al. | 432/58 |
| 4,270,900 | 6/1981 | Shy et al. | 432/58 |

Primary Examiner—Henry C. Yuen
Attorney, Agent, or Firm—Learman & McCulloch

[57] ABSTRACT

Apparatus for heat treatment of fine-grained material has a multi-stage cyclone preheater, a rotary kiln, and a gas pipe extending between the kiln and the preheater and forming a calcination zone for precalcining materials entrained in the gas stream. The gas pipe has an upwardly extending pipe section that communicates with an arcuate deflector section and a downward pipe section which extends downwards to and communicates with the lowest cyclone stage. The downwardly extending pipe section of the gas pipe has an extension constructed as a coarse separator so that relatively coarse material particles contained in the mixed gas-material stream are kept away from the lowest cyclone stage of the preheater.

13 Claims, 6 Drawing Figures

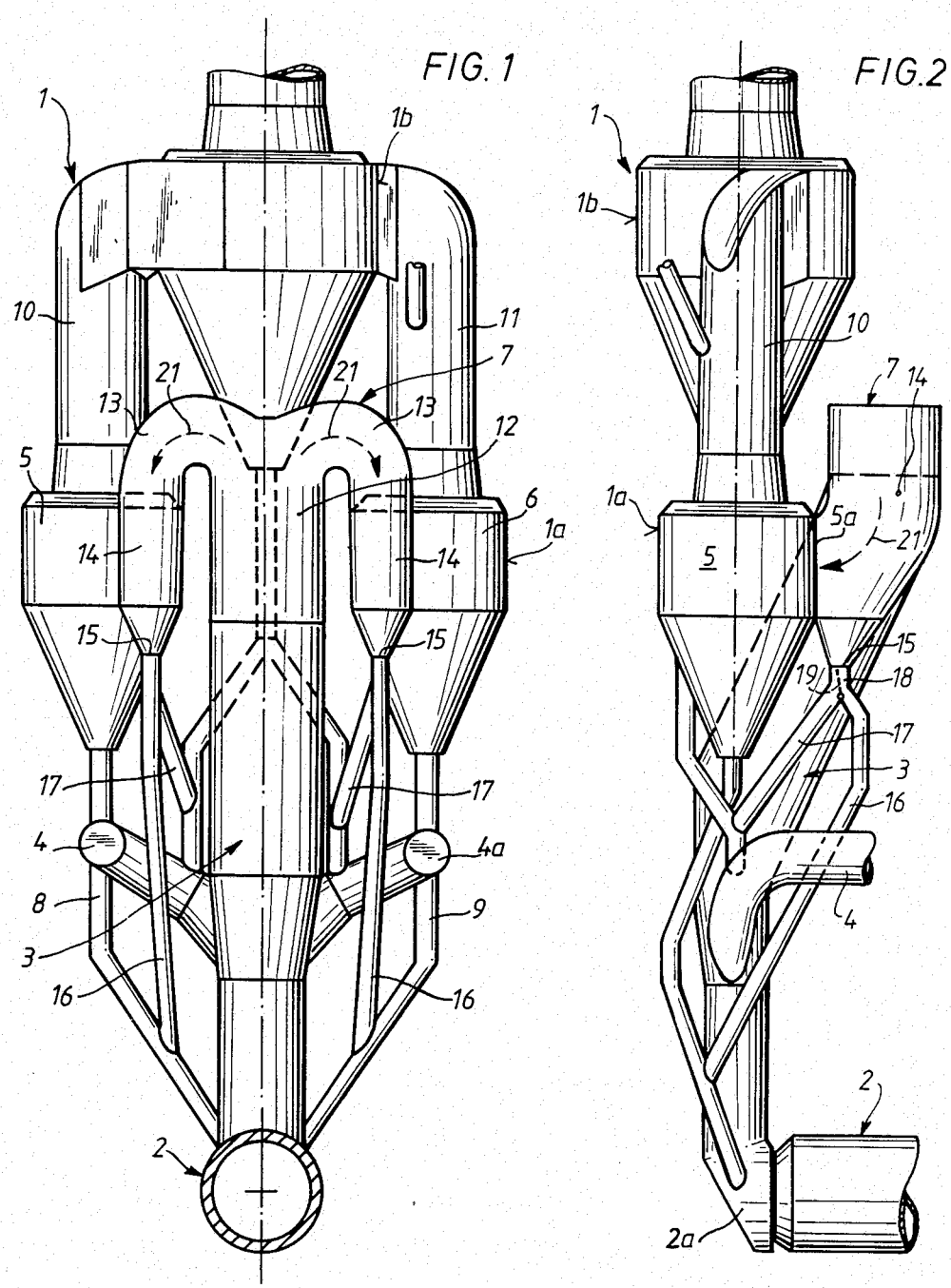

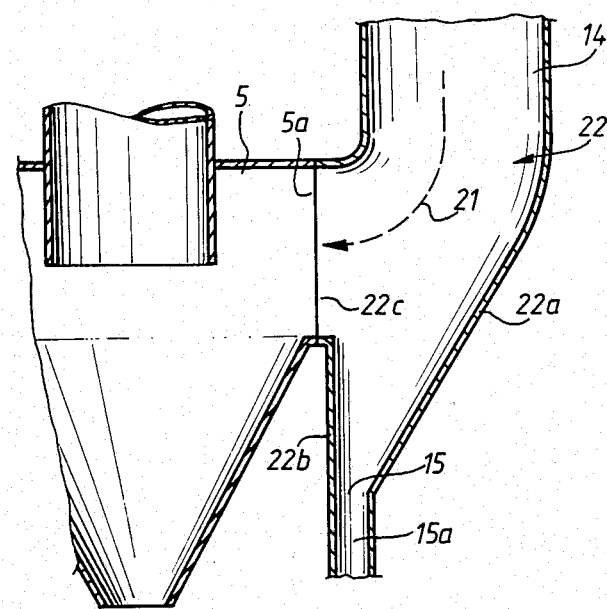
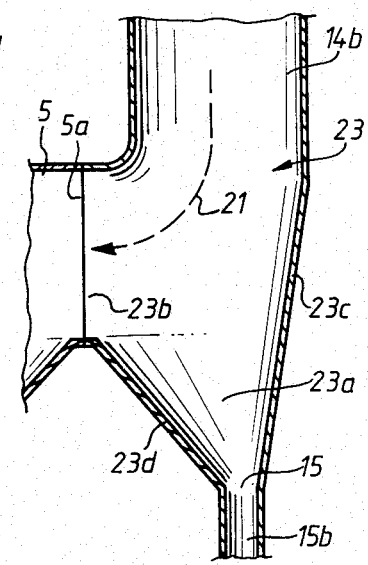
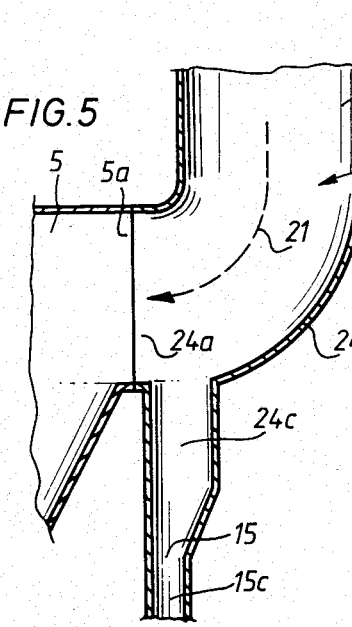
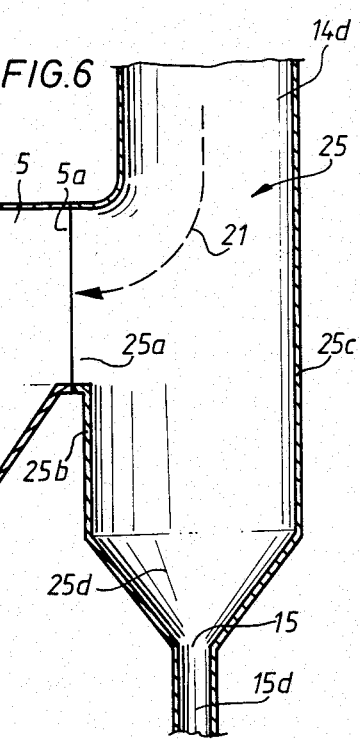

APPARATUS FOR HEAT TREATMENT OF FINE-GRAINED MATERIAL

BACKGROUND OF THE INVENTION

The invention relates to apparatus for heat treatment of fine-grained material, such apparatus including a multi-stage cyclone preheater for preheating the material, a rotary kiln for final burning of the material, and a calcination zone arranged in a gas pipe between the rotary kiln and the cyclone preheater for further heating of the preheated material by means of additional fuel before the material enters the rotary kiln. The gas pipe leading from the calcination zone to the lowest stage of the cyclone preheater has an upwardly extending pipe section, a deflector section, and a downwardly extending pipe section which communicates with the lowest cyclone stage.

Apparatus of the aforesaid type already is in use. In operation of such apparatus it is not uncommon for material deposits to be formed in the gas pipe between the rotary kiln and the lowest stage of the cyclone preheater, that is to say in the calcination zone. These deposits may be partially broken up and some parts thereof carried by the stream of gas into the lowest cyclone stage of the preheater. The material deposits in this lowest cyclone stage frequently block the material outlets of the cyclone in an undesirable manner and this results in complicated cleaning operations which necessitate periods of idleness (stoppages of production).

SUMMARY OF THE INVENTION

An object of the invention is to improve apparatus of the type described in such a way that the blockages and consequent disadvantages thereof are avoided.

This is achieved according to the invention by constructing the downwardly extending pipe section (of the gas pipe) as a coarse separator.

The use and construction according to the invention of such a coarse separator makes it possible to catch all the coarse material deposits formed in the calcination zone practically directly before they enter the lowest cyclone stage, so that only fine-grained material and material in powder form can reach the lowest cyclone stage of the preheater. Thus material blockages attributable to coarse material deposits and consequent cleaning operations in the region of the material outlets of the cyclone are reliably avoided.

DESCRIPTION OF THE DRAWINGS

Further details and advantages of the invention are set out in the following description of several embodiments which are schematically illustrated in the drawings, wherein:

FIG. 1 is a front elevation, partly in section, of the apparatus according to the invention illustrating two lowest preheater cyclone stages, the calcination zone, and the rotary kiln;

FIG. 2 is a side view of the construction shown in FIG. 1; and

FIGS. 3, 4, 5, and 6 are sectional views illustrating details of four different modifications of a coarse separator arranged before the lowest cyclone stage.

DETAILED DESCRIPTION

The general construction of the apparatus intended for heat treatment of fine grained material will be described with reference primarily to FIGS. 1 and 2. Crude cement dust is a particular example of fine-grained material which, after preheating, is first to be further heated and then thoroughly calcined so that it can then be finally burnt in a known manner.

The heat treatment apparatus contains a multi-stage cyclone preheater 1 for preheating the material, a rotary kiln 2 (only generally indicated here) in which the material is finally burnt, and a gas pipe 3 which connects the inlet housing 2a of the rotary kiln 2 to the lowest cyclone stage 1a of the preheater 1. A calcination zone is provided in the gas pipe 3 in a manner which is known per se, and material which has been preheated in the preheater 1 is further heated in the calcination zone by the combustion of additional fuel in the gas pipe before the material enters the rotary kiln 2. Thus feed pipes and burners for burning additional fuel in the gas pipe 3 can be provided in a known manner, but this is not illustrated herein. In the embodiment illustrated in FIGS. 1 and 2 an air or gas pipe (of which only two branch pipes 4, 4a are indicated) which comes from a cooler (not shown) known per se, is connected in the region of the lower section of the gas pipe.

As is best shown in FIG. 1, the lowest preheater cyclone stage 1a contains two cyclones 5, 6 arranged in parallel, the inlets of which (e.g. 5a) are connected to the upper regions 7 of the gas pipe 3; the material discharge pipes 8, 9 of these two lowest cyclones 5, 6 open into the inlet housing 2a of the rotary kiln 2, while the exhaust gas pipes 10, 11 lead in the usual way to the second lowest stage 1b of the cyclone preheater 1.

Since the upper region 7 of the gas pipe 3 is connected to both lowest cyclones 5, 6, it is divided into two branches which are of the same size and construction. In this way the upper gas pipe region 7 in this embodiment has an upwardly extending pipe section 12 and, in the region of each of its branches, an arcuate deflector section 13 (with a deflection of approximately 180°) and a downwardly extending pipe section 14 having an opening leading into the appertaining cyclone 5 or 6 of the lowest cyclone stage 1a. According to FIG. 2 the downwardly extending pipe sections 14 are preferably connected directly to the corresponding inlets (e.g. 5a) of the appertaining cyclones 5, 6 approximately in the region of the side wall thereof.

The downwardly extending pipe section 14 has an extension that projects below the opening into the cyclone and such extension 7 is constructed as a coarse separator. In the illustrated embodiment two pipe sections 14 extend from the upper pipe section 7, and each of the two branches is of corresponding construction. The coarser separator formed by the pipe section 14, as will be explained in greater detail below, is of such a form that coarse material deposits (also including corresponding agglomerates and the like) which are carried with the exhaust gases from the rotary kiln into the upper gas pipe region 7 can be eliminated from these kiln exhaust gases before the exhaust gases reach the lowest cyclones 5, 6 of the lowest cyclone stage 1a; however, the construction is such that the remaining material to be treated which is in fine grains or optionally in powder form, as desired, is introduced into the cyclones 5, 6 of the lowest cyclone stage, that is to say it is not eliminated in the coarse separator.

The size of the material discharge opening 15 of the coarse separator 14 thus formed is less than that of the opening into the cyclone and can generally be chosen so that the coarse material deposits to be expected can be reliably discharged. This material discharge opening 15 of the coarse separator can be connected via a coarse material pipe 16 to the inlet housing 2a of the rotary kiln 2, preferably via the material discharge pipes 8, 9, or the material discharge opening 15 is connected via a coarse material pipe 17 to the gas pipe 3 and therefore to the calcination zone. It is, however, particularly advantageous if these two last-mentioned possiblities for connection are provided by the coarse material pipes 16 and 17, and then a branch pipe 18 is advantageously provided below the material discharge opening 15 of each coarse separator and a distributor 19 is arranged in this branch pipe 18. A simple adjustable valve or finger valves can be provided as the distributor. This makes it possible for the coarse material precipitated in the coarse separator to be delivered either directly to the rotary kiln 2 or only to the calcination zone (in the gas pipe 3), and it is also possible to regulable proportions of the material precipitated in the coarse separator to be delivered in part to the rotary kiln 2 and in part to the calcination zone. The quantity of coarse material delivered to the calcination zone can thus be subjected to intensified calcination or deacidification in repeated circulation.

As regards the construction of a downwardly extending pipe section 14 forming a coarse separator there are numerous possibilities, some examples of which are illustrated in FIGS. 3 to 6 in a simplified partial vertical section; it may be assumed in each case that the coarse separator is arranged before (i.e., upstream of material flow) the lowest cyclone 5 of the lowst preheater cyclone stage 1a. In all four embodiments there are at least three substantially similar common features: (1) the actual coarse separator is constructed in the lower section 14a, 14b, 14c, 14d of the downwardly extending pipe section 14; (2) the coarse separator thus constructed has a lateral connection opening which is connected directly to the inlet opening of the first cyclone 5 forming the cyclone inlet 5a and is adapted to the cross-section thereof; and (3) a lower material discharge opening 15 with material discharge pipes 15a . . . 15d.

In this construction of the coarse separator the gas stream 21 containing material particles is caused by the arcuate deflector section 13 to traverse an arcuate path. The opening into the cyclone is at the radially inner side of such path. Since the opening 15 is smaller than that into the cyclone, the gas has a tendency to flow into the cyclone along with the relatively fine particles. The relatively coarse particles are thrown to the radially outer side of the gas stream and thus flow vertically downwardly into the coarse separator.

FIG. 3 shows a coarse separator 22 (in the lower extension 14a of the downwardly extending pipe section 14) which is constructed in the form of a 45°–60° bend the lower external wall 22a of which is inclined relatively steeply downwards and together with the opposing approximately vertical wall 22b forms a narrow funnel section which is inclined on one side substantially below the lateral connection opening to the cyclone 5.

In the embodiment according to FIG. 4 the coarse separator 23 is formed essentially by the lower extension 14b of the downwardly extending pipe section and by a funnel section 23a connected downwardly thereon which has, opposite the lateral connection opening 23b, a relatively steeply inclined side wall 23c and, connected to the lateral connection opening 23b, a rather steeply downwardly inclined side wall 23d.

In the example shown in FIG. 5 the coarse separator 24 is formed by a bend of approximately 90° constituting the lower extension 14c of the downwardly extending pipe section. Just before the junction of the lateral connection opening 24a on the inlet opening of the cyclone 5 a downwardly directed material collecting part 24c like a short pipe is connected in the lower outer wall 24b to the material discharge opening and the material discharge pipe 15c.

Finally, FIG. 6 shows an embodiment in which the lower extension 14d of the downwardly extending pipe section has the form of a high, straight and narrow container and thus forms the coarse material separator. The lateral connection opening 25a of this coarse material separator is arranged aproximately in the central region of the height of the side wall 25b, and this side wall 25b lies opposite a side wall 25c running approximately parallel to it. An approximately symmetrical funnel part 25d is connected at the lower end of the side walls 25b and 25c with the material discharge opening 15 and the material discharge pipe 15d.

The four embodiments described above (FIGS. 3 to 6) should emphasize sufficiently clearly that the construction of the coarse separator can be adapted to the most varied operating conditions which may be expected; the material discharge opening 15 of each coarse separator is also adapted in its cross section to the greatest coarse material dimensions to be expected. In addition it is advantageously possible to arrange known filling level monitoring arrangements (e.g., gamma radiators) in the outlet or funnel region of such a coarse separator so that any blockages can be cleared when required. It should, however, be noted that the clearance of any blockage in the coarse separator can be undertaken during operation of the whole treatment apparatus without any disruptions occurring, especially in the function of the appertaining cyclones.

While a cyclone preheater has been described which contains two parallel cyclones in its lowest cyclone stage (FIG. 1), as is the case with so-called double-stream preheaters, naturally any other suitable type of cyclone preheater can be used, for example a so-called single-stream construction in which each cyclone stage contains only one single cycle. As regards the construction and appearance of the gas pipe leading from the inlet housing of the rotary kiln to the lowest stage of the cyclone preheater nothing need be altered. This also applies to a further variant according to which the calcination zone is operated without additional gas supplied from the cooler, that is to say in this case no air or gas is delivered to the gas pipe 3 from the cooler, and the pipes 4, 4a can be omitted.

I claim:

1. In apparatus for the heat treatment of fine-grained material having a multi-stage cyclone preheater for preheating material, a kiln for final burning of the material, and a calcination zone located in a gas pipe extending between the kiln and the preheater for further heating of the preheated material before the material enters the rotary kiln, and wherein that part of the gas pipe between the calcination zone and the lowest stage of the cyclone preheater has an upwardly extending pipe section, a deflector section and a downwardly extending pipe section having an opening into the lowest cyclone stage, the improvement wherein the downwardly extending pipe section has an extension extending downwardly beyond said opening and forming a coarse separator.

2. Apparatus according to claim 1 wherein the coarse separator has a material discharge opening communicating with the kiln via a kiln inlet housing.

3. Apparatus according to claim 1 wherein the coarse separator has a material discharge opening communicating with the calcination zone.

4. Apparatus according to claim 1 wherein said coarse separator has a material discharge opening in communication via a branched material pipe with said kiln and with said calcination zone.

5. Apparatus according to claim 4 including a distributor in said branched pipe for directing selected quantities of materials to said kiln and to said calcination zone.

6. In apparatus for the heat treatment of fine-grained material having a multi-stage preheater for preheating said material, a kiln for final burning of such material, conduit means for delivering preheated material from the final stage of said preheater to said kiln, and a gas pipe extending between said kiln and the final stage of said preheater for delivering hot gases from said kiln to said preheater, the improvement wherein said gas pipe has an upper section defining an arcuate path for said gases flowing from said kiln toward said preheater, said upper section of said gas pipe having an opening in communication with said final stage of said preheater at the radially inner side of said arcuate path, said gas pipe having an extension projecting downwardly past said opening, the construction being such that relatively fine particles entrained in said hot gases may flow into said final stage of said preheater and relatively coarse particles entrained in said hot gases flow past said opening into said extension.

7. Apparatus according to claim 6 wherein the cross-sectional area of said extension is less that that of said opening.

8. Apparatus according to claim 6 wherein the cross-sectional area of said gas pipe is greater than that of said extension.

9. Apparatus according to claim 6 wherein said extension has an outlet in communication with said kiln.

10. Apparatus according to claim 6 wherein said extension has an outlet in communication with said gas pipe.

11. Apparatus according to claim 6 wherein said extension has an outlet in communication with said conduit means.

12. Apparatus according to claim 6 wherein said extension has an outlet in communication with a branched pipe, one branch of which communicates with said kiln and another branch of which communicates with said gas pipe.

13. Apparatus according to claim 12 including distributor means between said outlet and said branched pipe for regulating material flow into the respective branches.

* * * * *

UNITED STATES PATENT AND TRADEMARK OFFICE
CERTIFICATE OF CORRECTION

PATENT NO. : 4,490,109
DATED : December 25, 1984
INVENTOR(S) : Karl Krutzner

It is certified that error appears in the above—identified patent and that said Letters Patent are hereby corrected as shown below:

Column 2, line 52, change "coarser" to -- coarse --.

Column 3, line 18, change "to" to -- for -- .

Column 3, line 31, change "lowst" to -- lowest -- .

Column 4, line 44, change "cycle" to -- cyclone -- .

Signed and Sealed this

Fourteenth Day of May 1985

[SEAL]

Attest:

DONALD J. QUIGG

Attesting Officer     Acting Commissioner of Patents and Trademarks